E. O. MARSHALL.
WEED CUTTING MACHINE.
APPLICATION FILED JULY 16, 1912.

1,059,889.

Patented Apr. 22, 1913.

3 SHEETS—SHEET 1.

WITNESSES

INVENTOR
Ezra O. Marshall,
BY
ATTORNEYS

E. O. MARSHALL.
WEED CUTTING MACHINE.
APPLICATION FILED JULY 16, 1912.
1,059,889.
Patented Apr. 22, 1913.
3 SHEETS—SHEET 2.
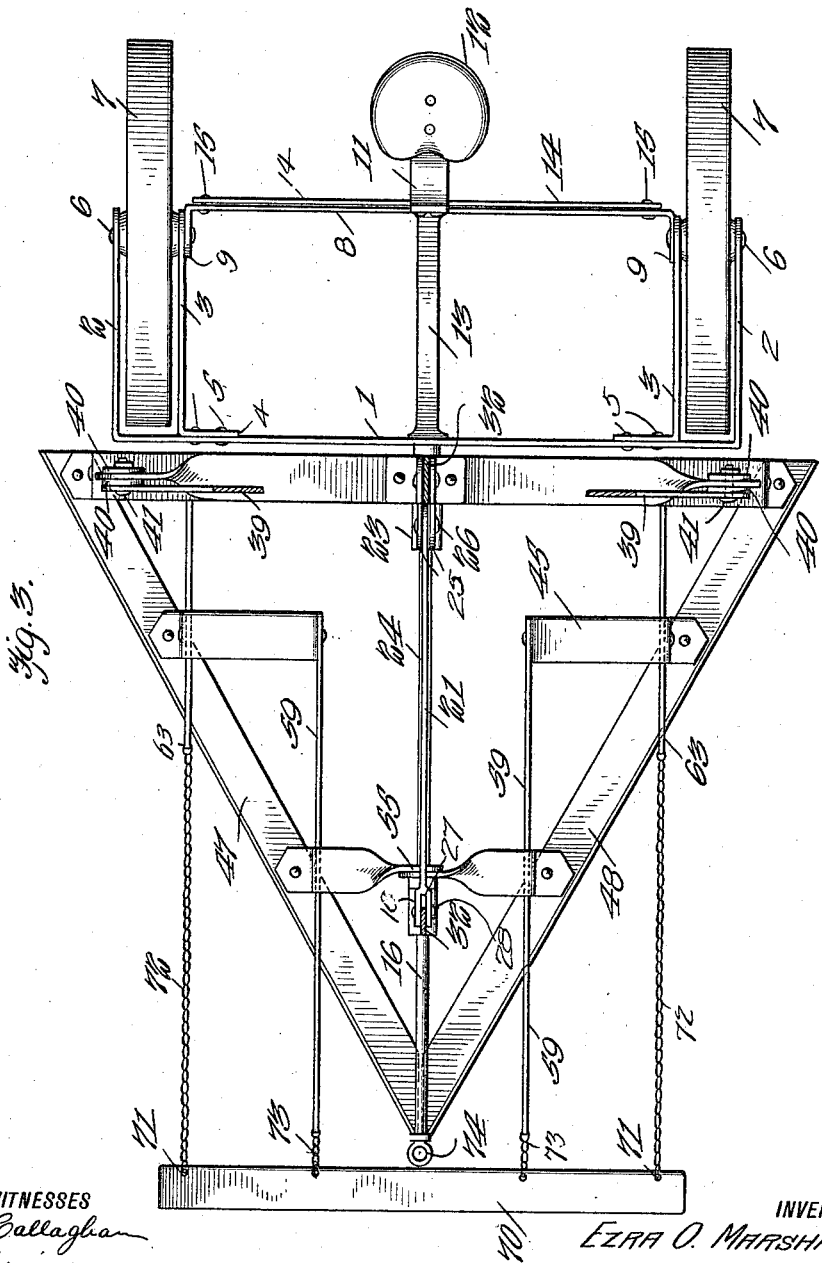
WITNESSES
INVENTOR
EZRA O. MARSHALL,
BY
ATTORNEYS E. O. MARSHALL.
WEED CUTTING MACHINE.
APPLICATION FILED JULY 16, 1912.
1,059,889.
Patented Apr. 22, 1913.
3 SHEETS—SHEET 3.
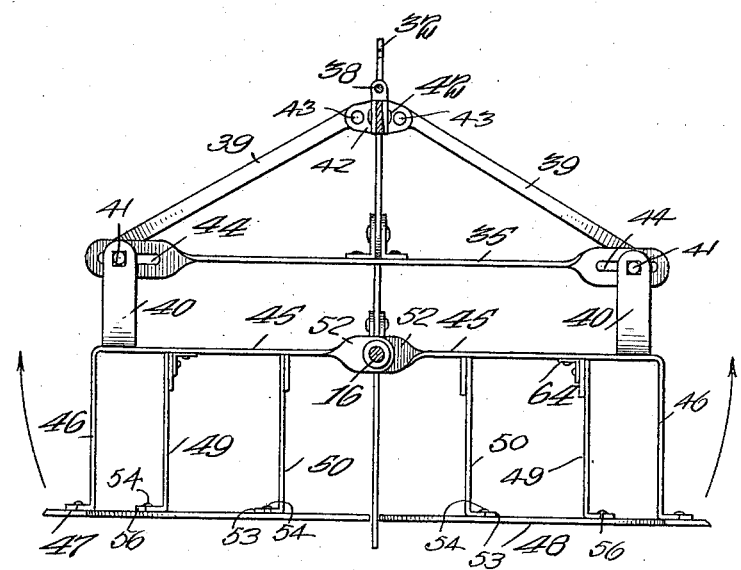
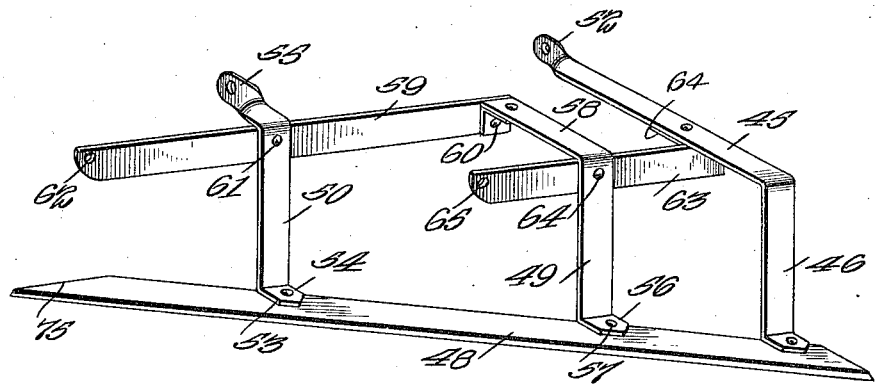
WITNESSES
INVENTOR
EZRA O. MARSHALL,
BY
ATTORNEYS

UNITED STATES PATENT OFFICE.

EZRA O. MARSHALL, OF WALLA WALLA, WASHINGTON.

WEED-CUTTING MACHINE.

1,059,889.  Specification of Letters Patent.  Patented Apr. 22, 1913.

Application filed July 16, 1912. Serial No. 709,780.

*To all whom it may concern:*

Be it known that I, EZRA O. MARSHALL, a citizen of the United States, and a resident of Walla Walla, in the county of Walla Walla and State of Washington, have invented certain new and useful Improvements in Weed-Cutting Machines, of which the following is a specification.

My invention is an improvement in weeding machines, and has for its object the provision of a machine of the character specified, especially adapted for clearing summer fallow ground of weeds, preparatory to seeding, wherein the cutting means moves beneath the surface of the ground, and may be adjusted vertically in accordance with the depth at which it is desired to cut the weeds.

Figure 1:
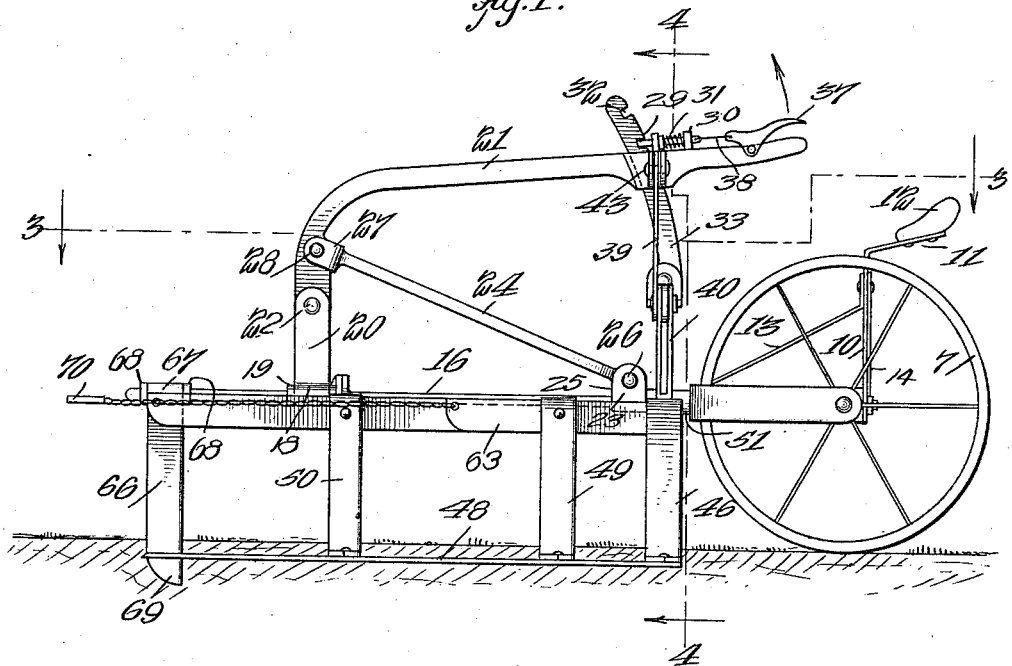
Figure 2:
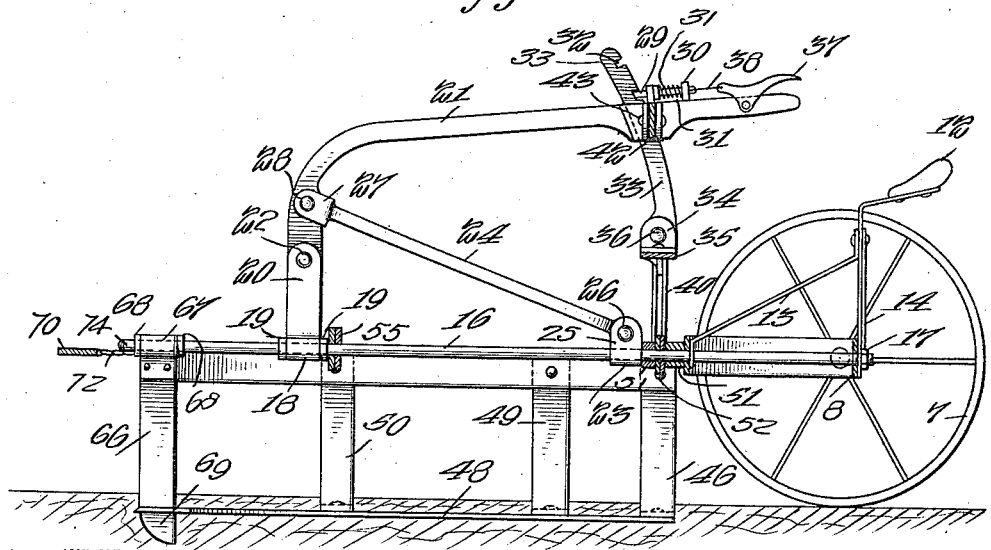

In the drawings:—Figure 1 is a side elevation of the improved machine; Fig. 2 is a longitudinal section on the line 2—2 of Fig. 3; Figs. 3 and 4 are sections on the lines 3—3 and 4—4 respectively, of Fig. 1; and, Fig. 5 is a perspective view of one of the blades and its mounting.

The present embodiment of the invention comprises a yoke shaped frame consisting of a body 1 and arms 2, and an arm 3 is secured to the body adjacent to and parallel with each arm 2. Each arm 3 has an angular portion 4 which is secured to the body of the yoke by means of rivets 5, and a stub shaft 6 is journaled between the free ends of each pair of arms 2 and 3.

A wheel 7 is journaled on each stub shaft, and a spacing bar 8 is arranged between the two arms 3 of the frame. The said bar 8 is provided at each end with an annular portion 9 lapping upon the end of the adjacent arm 3, and the stub shaft 6 at that side is also journaled in the angular portion of the bar. A seat plate 10 is connected to the central portion of the bar 8, and at its upper end the said plate is bent rearwardly, as shown at 11, and the seat 12 is secured to the said portion 11. The side plate is braced by an inclined front brace 13 and by inclined lateral braces 14, the outer ends of the said braces 14 being secured to the spacing bar 8 by means of rivets 15.

A rod 16 is journaled in the body 1 of the yoke and in the spacing bar 8, and the said rod extends forwardly over the frame. The rod is at the center of the frame, and the rear end thereof is engaged by a nut 17. A sleeve 18 is journaled on the rod near its front end, and is held from longitudinal movement by means of collars 19 one of which is arranged on the rod on each side of the sleeve. The sleeve is provided with a pair of upwardly extending lugs 20, and the front end of a curved lever 21 is pivoted between the lugs, as shown at 22. A second sleeve 23 is journaled on the rod adjacent to the frame, and a link 24 has one of its ends pivoted between a pair of lugs 25 extending upwardly from the sleeve, by means of a bolt or rivet 26.

The front end of the link 24 is provided with a fork 27, whose arms engage opposite faces of the lever 21, and are pivoted thereto by means of a bolt 28. A latch 29 is mounted to slide in bearings 30 on the rear end of the lever 21, and a spring 31 is provided for normally pressing the latch into engagement with one of the series of notches 32 on a notched sector 33 pivoted between a pair of lugs 34 on a plate 35 to be described by means of a bolt or rivet 36.

A latch lever 37 is pivoted to the lever 21, and a link 38 connects the lever to the latch 29 before mentioned. It will be evident that when the latch is released from engagement with the notches in the sector, the lever may be moved upwardly or downwardly to raise or lower the front end of the rod 16. The sector swings with the lever, and the lever and rod 16 swing on the link 24.

The plate 35, before mentioned, extends transversely of the rod 16 above the same, and a link 39 is pivoted to each end of the said plate, the said ends being given a quarter-turn, as shown in Fig. 3. A substantially U-shaped link 40 is arranged at each end of the plate 35, and the ends of each link are received on opposite sides of the adjacent end of the plate 35. The ends of the plate 35 are slotted longitudinally, as shown at 44, and a bolt 41 is passed through the ends of each link, the adjacent end of the link 39, and the adjacent slot of the plate 35. The inner end of each link 39 is pivoted between a pair of lugs 42 on the adjacent face of the lever 21, by means of the bolt or rivet 43. The body of each link 40 is connected to the outer end of a plate 45, whose inner end is pivoted on the rod 16. The inner end of each plate 45 is given a quarter-turn, as shown at 52, and is journaled on the shaft 16 between washers 51, one of which is arranged on the shaft adjacent to the body 1 of the yoke shaped frame, and the other adjacent to the sleeve 23.

The hanger 50 is provided at its lower end with an angular portion 53, secured to the adjacent plate 47 or 48 by a bolt or rivet 54, and the upper end of the hanger is bent laterally inward and given a quarter turn, as shown at 55 and journaled on the rod 16 immediately in rear of the sleeve 18. Each of the hangers 49 has a lateral lug 56 at its lower end secured to the adjacent blade 47 or 48 by a rivet 57, and the upper end of each hanger is bent laterally inward, as shown at 58, and is secured to the rear end of a plate 59, as indicated at 60. The plate 59 at each side of the rod 16 is also secured to the adjacent hanger 50 by means of a bolt or rivet 61, and the front end of each of the said plates is provided with a transverse opening 62. A similar plate 63 is secured to the hanger 49 at each side by means of a bolt or rivet 64, and to the adjacent plate 45 at the rear end of the said plate 63. Each plate 63 is secured to the plate 45 by means of an angle plate and rivets, as indicated at 64, in Fig. 4, and each of the said plates 63 has an opening 65 at its front end.

A cutting blade 66 is arranged at the front end of the rod 16, the said blade having a bearing 67 journaled on the rod between collars 68, and the lower end of the blade extends below the cutting blades 47—48 as shown more particularly in Figs. 1 and 2, and the lower front corner of the blade is rounded, as indicated at 69.

A draft bar 70 is arranged in front of the forward end of the rod 16 and the said draft bar is provided with a longitudinal series of openings 71. Chains 72 connect the draft bar with the plates 63, and other chains 73 connect the draft bar with the plates 59. Each chain has one end engaged with an opening in series 71, and the other end with an opening 62 or 65. The front end of the rod 16 is provided with a ring 74, to prevent disengagement of the collars 68 and sleeves 67.

It will be evident that each blade 47 or 48 is free to move vertically independently of the other blade, since its mounting is entirely separate from that of the other blade. The support for each blade is also independent of the support for the operator, that is the rear frame carried by the wheels 7. By means of the lever 21, the operator may regulate the depth of the cut of the blades 47 and 48, and also that of the blade 66.

In operation the machine is drawn through the field in the usual manner, the blades 47 and 48 being adjusted at the proper depth, and so held by means of the lever 21. The blades 47—48 are free to yield to avoid obstructions, such as stones, but under ordinary circumstances will thoroughly cut and remove all weeds and the like in the ground. The blade 66 divides the cut, being arranged between the forward beveled ends 75 of the blades 47—48.

I claim:

1. A machine of the character specified, comprising a wheeled main frame, a seat on the frame, a rod journaled longitudinally of the frame at the center thereof and extending forwardly therefrom, a cutting blade at each side of the rod, said blades converging toward the front end of the rod, a mounting for each blade, said mounting being journaled on the rod, and rigidly connected to the blade for supporting the blade in horizontal position below the level of the rod, a vertical cutting blade having a bearing for engaging the front end of the rod, said blade depending between the adjacent ends of the other blades, a draft bar in front of the rod, a flexible connection between the mounting of each blade and the draft bar, and means for raising and lowering the rod, said means comprising a link journaled on the rear end of the rod and inclining upwardly and forwardly from the rod, a lever having its front end curved downwardly and pivoted to the rod near its front end, a latch mechanism on the rear end of the lever, and a means for holding the lever in adjusted position.

2. A machine of the character specified, comprising a wheeled main frame, a seat on the frame, a rod journaled longitudinally of the frame at the center thereof and extending forwardly therefrom, a cutting blade at each side of the rod, said blades converging toward the front end of the rod, a mounting for each blade, said mounting being journaled on the rod, and rigidly connected to the blade for supporting the blade in horizontal position below the level of the rod, a vertical cutting blade having a bearing for engaging the front end of the rod, said blade depending between the adjacent ends of the other blades, a draft bar in front of the rod, a flexible connection between the mounting of each blade and the draft bar, and means for raising and lowering the rod.

3. A machine of the character specified, comprising a wheeled main frame, a seat on the frame, a rod journaled longitudinally of the frame at the center thereof and extending forwardly therefrom, a cutting blade at each side of the rod, said blades converging toward the front end of the rod, a mounting for each blade, said mounting being journaled on the rod, and rigidly connected to the blade for supporting the blade in horizontal position below the level of the rod, a vertical cutting blade having a bearing for engaging the front end of the rod, said blade depending between the adjacent ends of the other blades, draft mechanism connected to the mounting of the blades, and means for raising and lowering the rod.

4. A machine of the character specified, comprising a wheeled main frame, a seat on the frame, a rod journaled longitudinally of the frame at the center thereof and extending forwardly therefrom, a cutting blade at each side of the rod, said blades converging toward the front end of the rod, a mounting for each blade, said mounting being journaled on the rod, and rigidly connected to the blade for supporting the blade in horizontal position below the level of the rod, a vertical cutting blade depending from the rod between the adjacent ends of the first named blades, a draft mechanism connected to the mounting of the first named blades, and means for raising and lowering the rod.

5. A machine of the character specified, comprising a wheeled main frame, a rod journaled longitudinally of the frame at the center thereof and extending forwardly therefrom, means adjacent to the main frame for raising and lowering the rod, a cutting blade at each side of the rod, said blades converging toward the front end of the rod, a rigid mounting for each blade, each mounting being journaled on the rod, and supporting the blade below the level of the rod, a vertical cutting blade depending from the rod between the adjacent front ends of the first-named blades, and draft mechanism in front of the rod.

6. A machine of the character specified, comprising a main frame, a rod journaled longitudinally of the frame at the center thereof and extending forwardly from the frame, a cutting blade at each side of the rod, said blades converging toward the front end of the rod, a mounting rigid with each blade and journaled on the rod, said mounting supporting the blades below the level of the rod, means for simultaneously raising and lowering the blades, and draft mechanism connected with the blades.

7. A machine of the character specified, comprising a main frame, a rod journaled longitudinally of the frame at the center thereof and extending forwardly from the frame, a cutting blade at each side of the rod, said blades converging toward the front end of the rod, a mounting rigid with each blade and journaled on the rod, said mounting supporting the blades below the level of the rod.

EZRA O. MARSHALL.

Witnesses:
   M. STILES,
   YOST SCHULER.

---

Copies of this patent may be obtained for five cents each, by addressing the "Commissioner of Patents, Washington, D. C."